(12) United States Patent
Moir et al.

(10) Patent No.: US 7,171,537 B1
(45) Date of Patent: Jan. 30, 2007

(54) NON-BLOCKING GROWABLE ARRAYS

(75) Inventors: Mark S. Moir, Somerville, MA (US); Simon Doherty, Wellington (NZ)

(73) Assignee: Sun Microsystems, Inc., Santa Clara, CA (US)

( * ) Notice: Subject to any disclaimer, the term of this patent is extended or adjusted under 35 U.S.C. 154(b) by 405 days.

(21) Appl. No.: 10/866,570

(22) Filed: Jun. 11, 2004

(51) Int. Cl.
*G06F 12/00* (2006.01)

(52) U.S. Cl. .................................. 711/170; 711/220

(58) Field of Classification Search ............ 711/170, 711/220, 221
See application file for complete search history.

(56) References Cited

U.S. PATENT DOCUMENTS

2003/0187877 A1* 10/2003 Kuboyama et al. ...... 707/104.1

* cited by examiner

*Primary Examiner*—Jack A. Lane
(74) *Attorney, Agent, or Firm*—Robert C. Kowert; Meyertons, Hood, Kivlin, Kowert & Goetzel, P.c.

(57) ABSTRACT

A computer system stores a dynamically sized array as a base array that contains references to subarrays in which the (composite) array's data elements reside. Each of the base-array elements that thus refers to a respective subarray is associated with a respective subarray size. Each base-array index is thereby at least implicitly associated with a cumulative base value equal to the sum of all preceding base indexes' associated subarray sizes. In response to a request for access to the element associated with a given (composite-array) index, the array-access system identifies the base index associated with the highest cumulative base value not greater than the composite-array index and performs the access to the subarray identified by the element associated with that base index. Composite-array expansion can be performed in a multi-threaded environment without locking, simply by employing a compare-and-swap or similar atomic operation.

63 Claims, 9 Drawing Sheets

```
#define BLK(x) (32-nlz(x))
#define OFF(x,blk) (x & (0x7fffffff >> (32-blk)))

unsigned int nlz(unsigned int x){ int y, m, n;

y = -(x >> 16);
  m = (y >> 16) & 16;
  n = 16 - m;
  x = x >> m;

y = x - 0x100;
  m = (y >> 16) & 8;
  n = n + m;
  x = x << m;

y = x - 0x1000;
  m = (y >> 16) & 4;
  n = n + m;
  x = x << m;

y = x - 0x4000;
  m = (y >>16) & 2;
  n = n + m;
  x = x << m;

y = x >> 14;
  m = y & ~(y >> 1);
  return n + 2 - m;
}
```

NON-BLOCKING GROWABLE ARRAYS

BACKGROUND OF THE INVENTION

1. Field of the Invention

The present invention is directed to accessing and maintaining arrays of data elements. It particularly concerns elements of arrays whose sizes can be changed dynamically.

2. Background Information

In computer programming, it is often convenient to refer to a plurality of data objects as a group, or array. For example, the array may be referred to as MyArray, whereas its first and fourth elements may be referred to as MyArray[0] and MyArray[3].

Most often, the array's size is assigned at the outset, and a block of memory space suitable for containing an array of that size is allocated. The array may be allocated statically, i.e., when the program is initially loaded, or dynamically, i.e., at a point in the program's execution at which it is determined that the array will be needed. Even though the program allocates the array dynamically, the array's size may be fixed when that allocation occurs.

But there are programs in which it is inconvenient to restrict arrays to fixed sizes. The array's ultimate needed size may be unknown but potentially very large when the array is initially allocated, and it may be wasteful to allocate the maximum possible array size initially. In such situations, programs often implement "growable" arrays.

A well-known approach to doing so is as follows. When the program determines that the array needs to include more elements than the memory so far allocated to it can hold, it allocates space twice as large as the array's previous space, copies the current contents into the new space's first half, and then adds new elements to the new space's second half, possibly initializing the second-half contents in the process. Pointers to the array are then adjusted to refer to the array's new location.

This approach has become popular, because it enables the program to avoid allocating space of the maximum size when an array that may never grow to that size is initially allocated. But it has certain disadvantages, a principal one of which manifests itself in multi-threaded programs, in which multiple concurrently executing threads may seek access to the same array. There are many situations in which it is difficult or impossible to insure that the program will behave correctly if one thread's access to the array occurs concurrently with another thread's copying expansion of that array. So multi-threaded programs often need to employ locks: when a thread is performing a copying expansion on an array, it prevents other threads from accessing the array. Such locking reduces performance and affects scalability adversely. It may also reduce a system's fault tolerance, and it can cause priority inversion in real-time systems.

SUMMARY OF THE INVENTION

We have recognized that these problems can be reduced, and attendant advantages afforded, if the growable array is implemented as a composite array that comprises constituent arrays located in respective memory blocks that are not necessarily contiguous but are specified by respective elements of a base array. The computer system that includes the memory containing the data is programmed to operate as an array-access system that associates a respective subarray size with each base-array index in a sequence of such indexes. Such an association implicitly associates with each base-array index a cumulative base value that is equal to the sum of the subarray sizes associated with all preceding base-array indexes.

When the array-access system then receives an array-access request that includes an array reference and specifies an array index selected from a sequence of composite-index values, the array-access system infers the base array's location from the array-access request by, for example, treating the array reference as a reference to a base array. The array-access system also determines, out of the sequence of base-array indexes, which one is the last in that sequence whose cumulative base value is less than or equal to the number of composite-index values that precede the specified composite-array index, it treats as a reference to a constituent array the contents of the base-array element identified by that base-array index, and it performs the access on (i.e., reads or writes an element of) that constituent array. Preferably, the size associated with each of at least the higher base-array indexes is twice the subarray size associated with the preceding base-array index: the subarray sizes preferably increase exponentially.

A principal advantage of this approach to array growth is that it does not require copying, so it avoids most of the copying approach's drawbacks. For example, whereas the conventional, copying approach to growable arrays requires about half again as much memory as the new array—it needs space for the old and new arrays both—the present invention can be implemented in a way that requires only as much memory as the new array.

Additionally, since the total, composite array comprises a plurality of subarrays that do not need to occupy contiguous memory, the invention can be implemented in a way that is robust to memory fragmentation. This is true even though the subarray sizes associated with the higher base-array indexes may be quite large.

For example, suppose that the base array consists of thirty-two elements i, where i=0, . . . , 31. Suppose further that, for each i>0, each element i is associated with subarray size $2^{i-1}$. In such a system the subarray size associated with the base element whose base-array index is 31 is $2^{30}$, i.e., over a billion elements. But some of the subarrays may themselves be composite arrays: the division of arrays into subarrays can be recursive so that, if there is no free-memory block large enough to accommodate the new subarray, that subarray will itself be allocated in smaller blocks containing subarrays of the large subarray.

BRIEF DESCRIPTION OF THE DRAWINGS

The invention description below refers to the accompanying drawings, of which.

DETAILED DESCRIPTION OF AN ILLUSTRATIVE EMBODIMENT

A computer system configured to employ the present invention's teachings will respond to a request for an access to a growable array in a manner presently to be described. The computer system may be hardware-configured to provide such access, but it will more typically be configured in that manner by software, i.e., by sequences of instructions that, when the computer system executes them, will result in the behavior to be described below.

Figure 1:
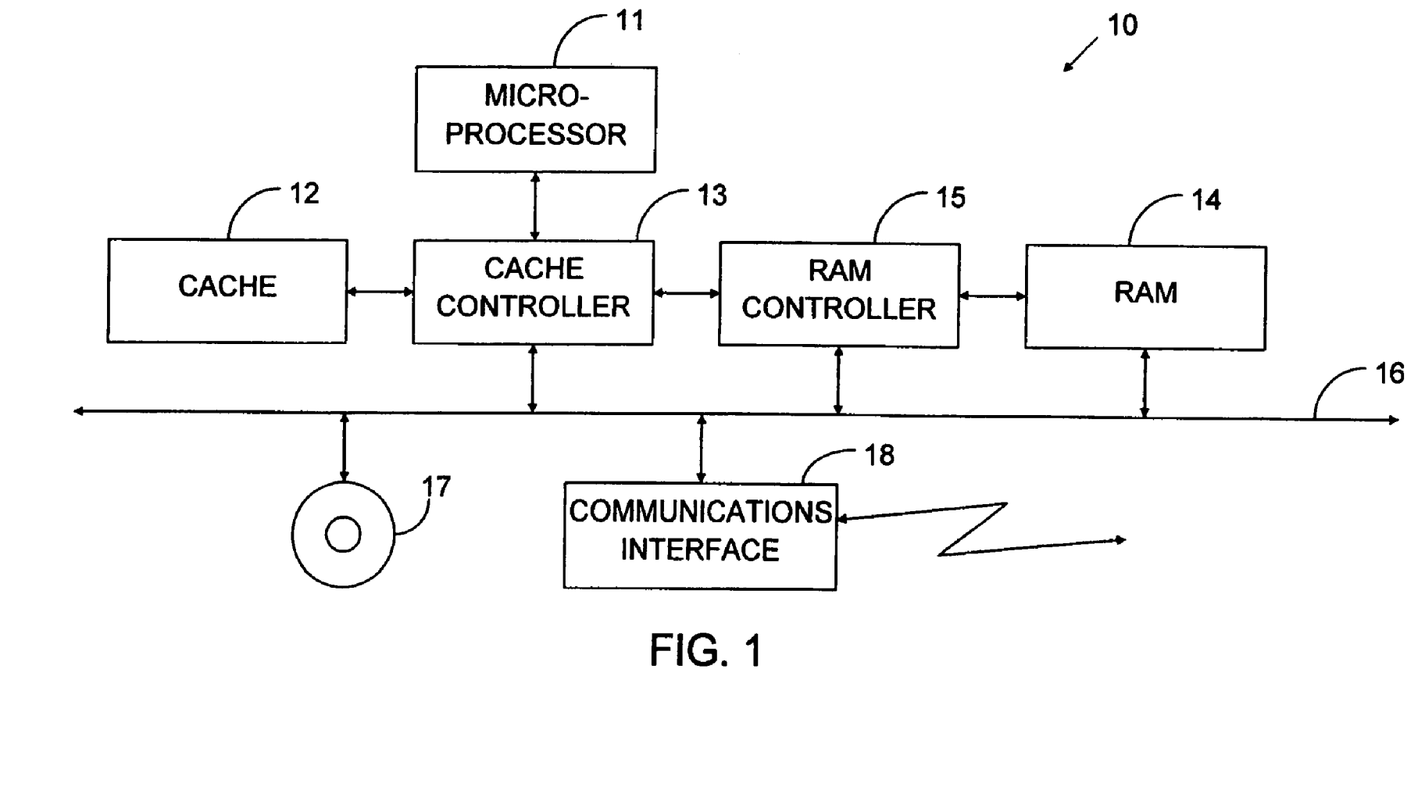
FIG. 1 is a block diagram of one type of computer system in which the present invention's teachings may be implemented.

FIG. 1 depicts a typical computer system 10. Data that a microprocessor 11 uses and instructions for operating on them may reside in on-board cache memory or be received from further cache memory 12, possibly through the mediation of a cache controller 13. That controller 13 can in turn receive such data from system read/write memory ("RAM") 14 through a RAM controller 15 or from various peripheral devices such as a communications interface 16 through a system bus 17. The memory space made available to an application program may be "virtual" in the sense that it may actually be considerably larger than RAM 14 provides. So the RAM contents will be swapped to and from a system disk 18.

Additionally, the actual physical operations performed to access the most-recently visited parts of the process's address space often will actually be performed in the cache 12 or in a cache on board microprocessor 11 rather than in the RAM 14. Those caches would swap data and instructions with the RAM 14 just as the RAM 14 and system disk 18 do with each other.

To implement the present invention's teachings, FIG. 1's system disk 18 or some other machine-readable medium would typically contain instructions that the computer loads into the RAM 14 to configure it for growable-array access. In some cases, though, the instructions may instead be provided in a server system remote from processor. Conductor-guided electrical signals are usually used to communicate the instructions, but other kinds of electromagnetic signals, such as guided or unguided radio waves, microwaves, and both visible and invisible light, may be used instead.

Such instructions may, for instance, be provided as part of the computer's runtime system, i.e., as part of the library of routines that any application running in the system can call. Alternatively, they may be provided as one or more subroutines in a specific application. Or they may be in-lined in such an application's code.

One way in which source code may represent the access request is as a procedure call, such as GrArrayWrite(thisArray, i, x). In that example, the routine is passed three arguments. The first is a reference to an array, the second is an index that identifies the array element to be accessed, and the third is the value to be assigned that array element's contents.

Figure 2:
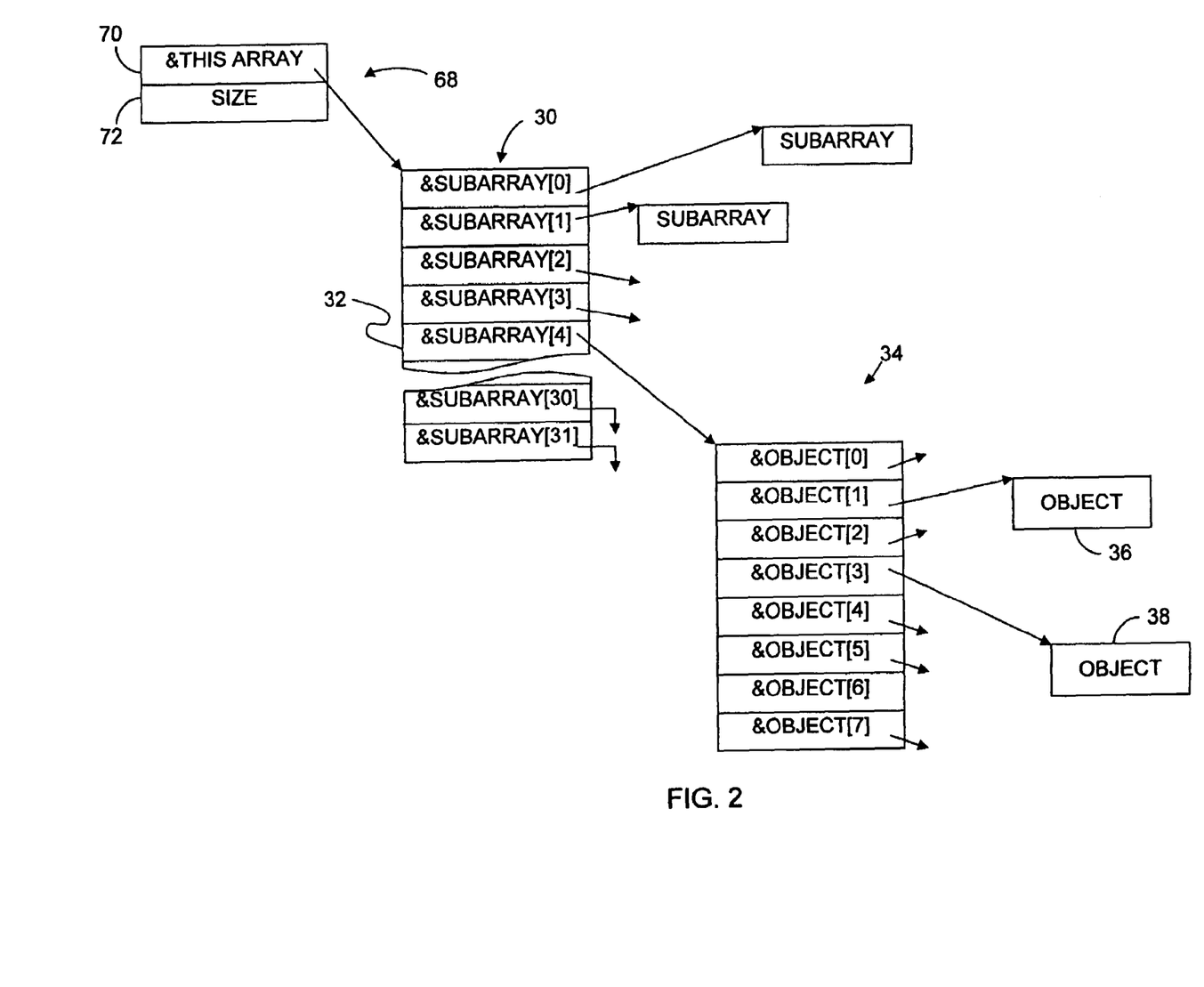
FIG. 2 is a data-structure diagram that illustrates data structures that the illustrated embodiment employs.

In the illustrated embodiment, the computer thus configured as an array-access system creates and accesses data structures such as those that FIG. 2 illustrates. The system associates a respective subarray size with each index value j in a sequence of index values associated with each respective data word in the FIG. 2 structure's base array 30 of contiguous data words, and it treats each such data word as a reference to a subarray whose size is the one associated with that data word's index.

Let us assume that there are thirty-two base-array elements, i.e., thirty-two contiguous words that can contain references to subarrays, and that the values for the base-array-element index j are 0, 1, . . . , 31. In the illustrative embodiment, the subarray size n associated with element j is given by:

$n=2$ for $j=0$, and
$n=2^j$ for $0<j<32$

To appreciate how the array-access system finds the location where the access is to occur, one can think of it as implicitly associating with each of the base-array elements a cumulative-count value equal to the total of the subarray sizes associated with all base-array elements that precede it in the index order. To identify the base-array element whose pointer contents should be followed to find the appropriate subarray, the system identifies the base-array element j associated with the highest cumulative-count value not greater than the number of (composite-) array-index values that precede index i. One way of computing that base-array index j is to determined in accordance with:

$j=\text{BLK}(i),$ where:
$\text{BLK}(i)=0$ for $i \leq 1$,
$\text{BLK}(i)=\text{floor}(\log_2(i))$ for $1<i2^-$, and floor(x) is the largest integer less than or equal to x. Having thus identified the base-array element in which to find the reference to the appropriate subarray, the array-access system follows the thus-found reference to the subarray. Suppose the base-array index thus found identifies FIG. 2's array element 32 and that element 32's contents identify a subarray 34. The array-access system would identify the correct subarray-element index k by finding the difference between the composite-array index i and the cumulative-size value associated with element 32. One approach to making this determination in the illustrative embodiment is to find it in accordance with:

$k=\text{OFF}(i),$ where:
$\text{OFF}(i)$ i for $i<1$
$\text{OFF}(i)=i-2^{\text{BLK}(i)}$ for $1<i<2^{31}$.

These functions can be computed in a small number of instructions.

As was explained above, the array-access system associates a subarray size, i.e., a number of array elements, with each base-array index, and that subarray size dictates how much memory needs to be allocated to the associated subarray. In many cases, the size of the memory block will equal the product of the array size and the individual-element size. If each element occupies four words, for instance, and the subarray size is eight elements, then the block allocated to the subarray could be thirty-two words. As FIG. 2 suggests, though, the subarray may be an array of pointers to respective objects such as objects 36 and 38, which constitute the array's elements. If the array-access system determines that the subarray-offset value is 3, for example, the array-access system will access object 38.

The manner in which the above-mentioned BLK and OFF functions are implemented will depend on the particular hardware and software environment. If they are implemented in an environment in which the processor or processors' instruction set includes not only a bit-reverse instruction and the standard bitwise logical operators but also a native population-count instruction—i.e., an instruction that returns the number of ones in the instruction argument—the BLK and OFF functions can be computed in a particularly rapid manner.

Consequently, the choice of implementation technique may take into account the intended system architecture. In some architectures, for example, the available instruction set may make it preferable to employ subarray sizes that are half those set forth above. That is, the subarray size n associated with element j could instead be given by:

n=1 for j=0, and $n=2^{j-1}$ for 0<j<32.

For such a data layout, the base-array element j would instead be given by:

$j=32-nlz(i)$, where nlz(i) is the number of leading zero's in the two's-complement representation of i. The desired location within the subarray would therefore be given by OFF$(i)=i$ & $(0x7fffffff>>nlz(i))$, where >> and & are respectively the standard C-programming-language right-shift and bitwise-logical-and operators. This approach may be preferable in architectures that provide a native nlz instruction.

Figure 3:
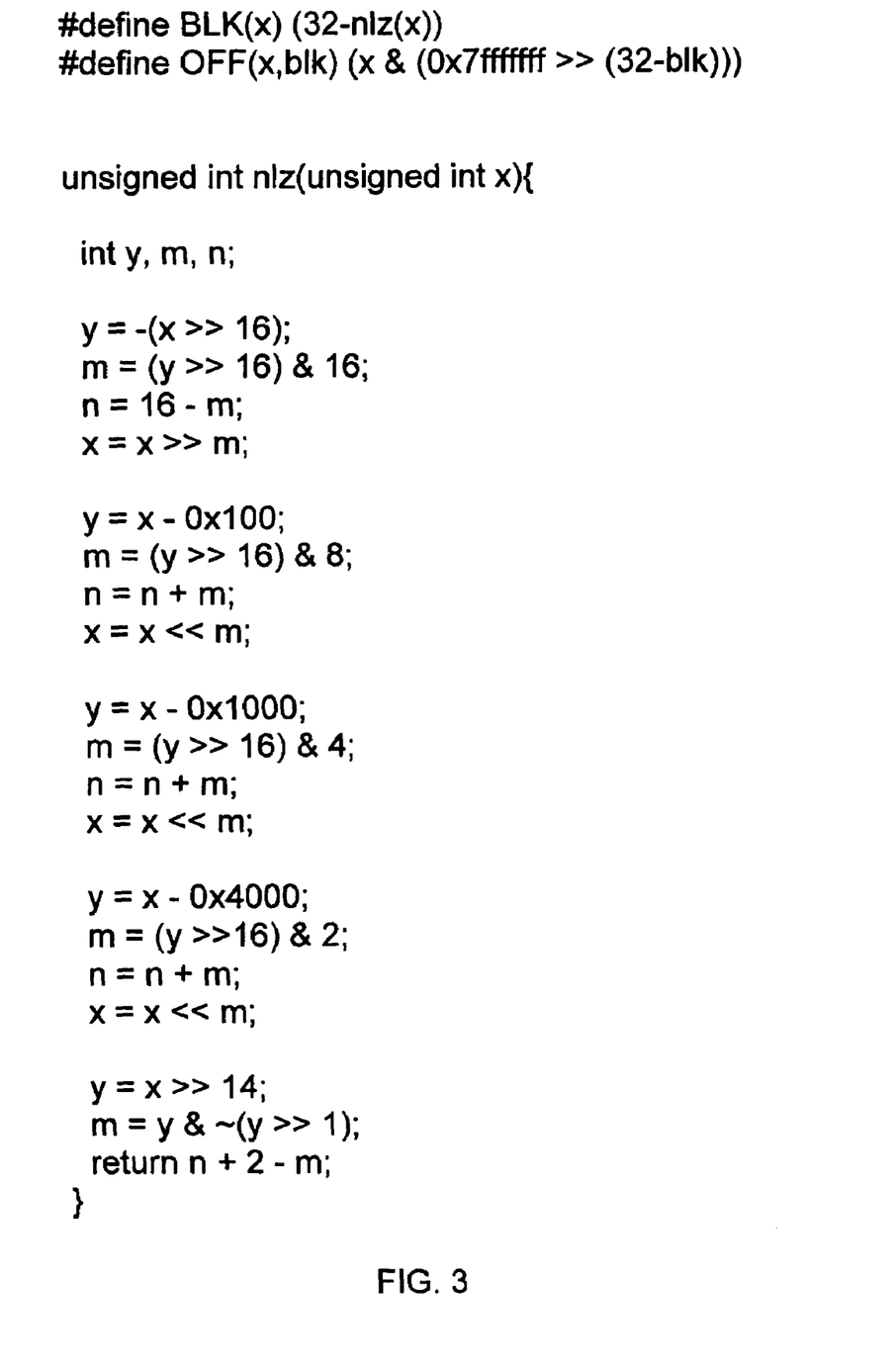
FIG. 3 is a source-code listing of macros that may be employed in implementing the present invention's teachings.

As an alternative, such functions can be implemented at the source-program level in accordance with the FIG. 3 listing. The BLK and OFF functions are in-lined by employing the macros that the listing's first two lines set forth. The first of those macros includes a call to a function nlz( ), which the remaining lines detail. That function, which is taken from FIGS. 5–10 of Henry S. Warren's *Hackers' Delight*, returns the number of leading zeros in its argument.

Figure 4:
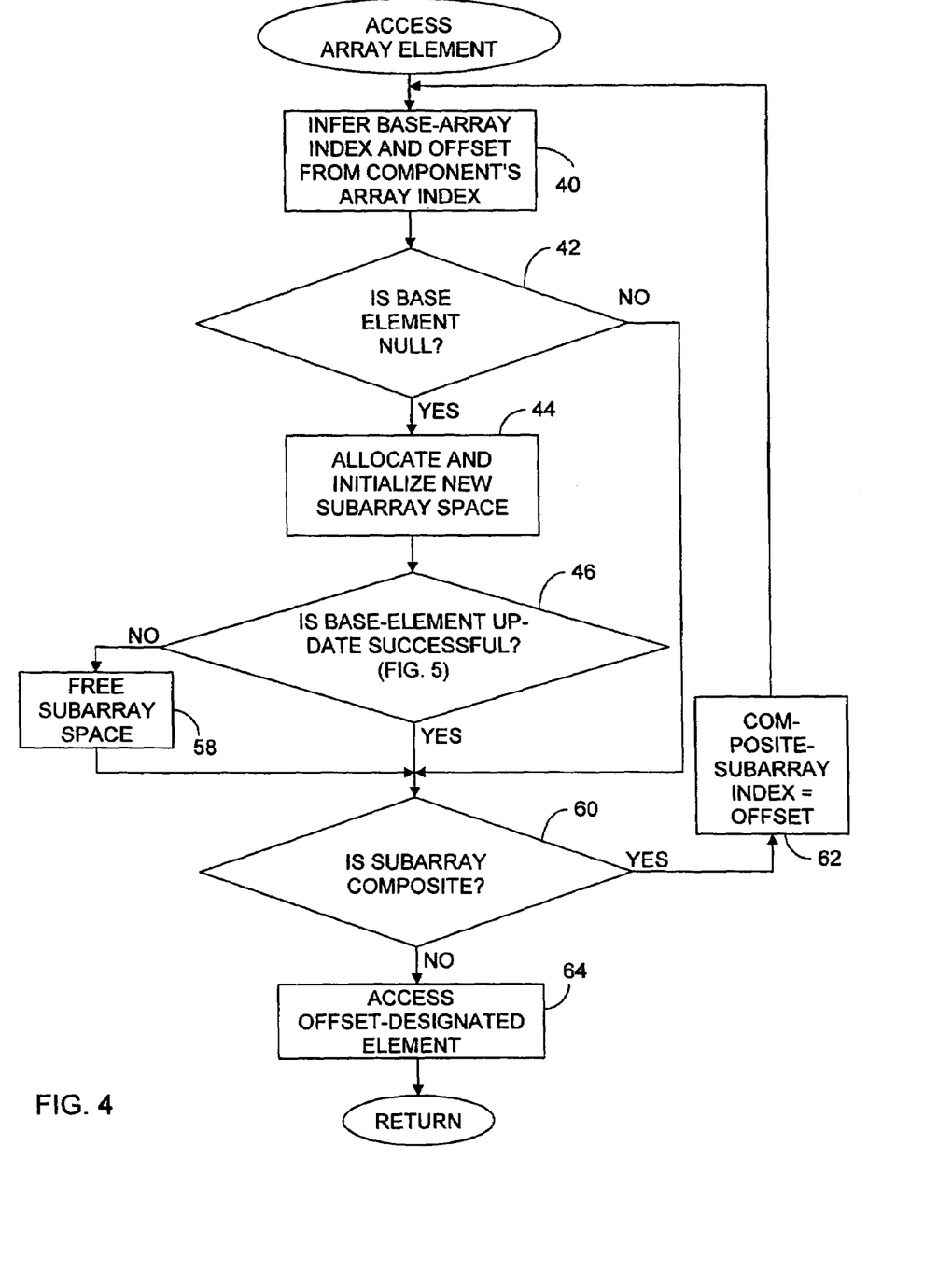
FIG. 4 is a flow chart that illustrates an access routine that the illustrated embodiment employs.

Having considered an example data structure and an approach to reading or writing in space already allocated to the growable array, we now turn to FIG. 4, which depicts a general access routine, one that is not based on the assumption that the space has already been allocated to the target array element. For the sake of discussion, we will assume that the particular requested access is a write access, although it will be apparent that the same routine can be employed for read accesses also.

Block 40 represents inferring the base-array index and offset in the manner described above. Having thus inferred the base-array index, the system reads the contents of the base element thereby identified. Ordinarily, that element will contain a pointer to a subarray. Occasionally, though, space for the subarray will not have been allocated yet. In the illustrative embodiment this fact is indicated by NULL contents.

If the contents are NULL and thereby indicate that no subarray has yet been allocated, a read-type-access operation will in some implementations simply return an appropriate empty-indicating value. In other implementations, a read-type-access operation will include allocating space for the element to which access was requested. And, in any event, the assumed write-type access operation will always include allocating the needed space. So FIG. 4 includes a block 42 that represents testing the base-array element's contents to determine whether they are NULL, and block 44 represents allocating the needed new subarray space if they are. In many cases, allocation will be accompanied by an initialization operation, in which predetermined initialization values are placed in some or all of the subarray space's locations.

In any event, the allocation of space to such constituent arrays does not require that any existing array elements be moved, because there is no need for the new constituent array to be contiguous to any other constituent array. The illustrated embodiment therefore refrains throughout the composite array's life from moving any of the composite-array elements: each element remains throughout that time in the virtual-memory location where it was placed initially.

Now, in multi-threaded implementations, it can occur that two different threads concurrently read a NULL base-element value and therefore concurrently allocate space to new subarrays. This could yield inconsistent results, since the second thread to write the base element will overwrite the first thread's pointer to the subarray in which it has written its update: the results of the first thread's access will be lost. Prior-art approaches to implementing growable arrays avoided inconsistent results of this sort by locking the array until it was copied into the new location and all appropriate references to the array were updated. This approach has the drawbacks mentioned above.

As will now be seen, the present invention can be implemented without such locking. Block 46 represents updating the base-element contents in a manner that avoids the inconsistent results. Specifically, the illustrated embodiment employs an operation that atomically (1) verifies that the base-element contents are still NULL and (2) if so, writes into that base-array element a reference to the subarray's location.

Figure 5:
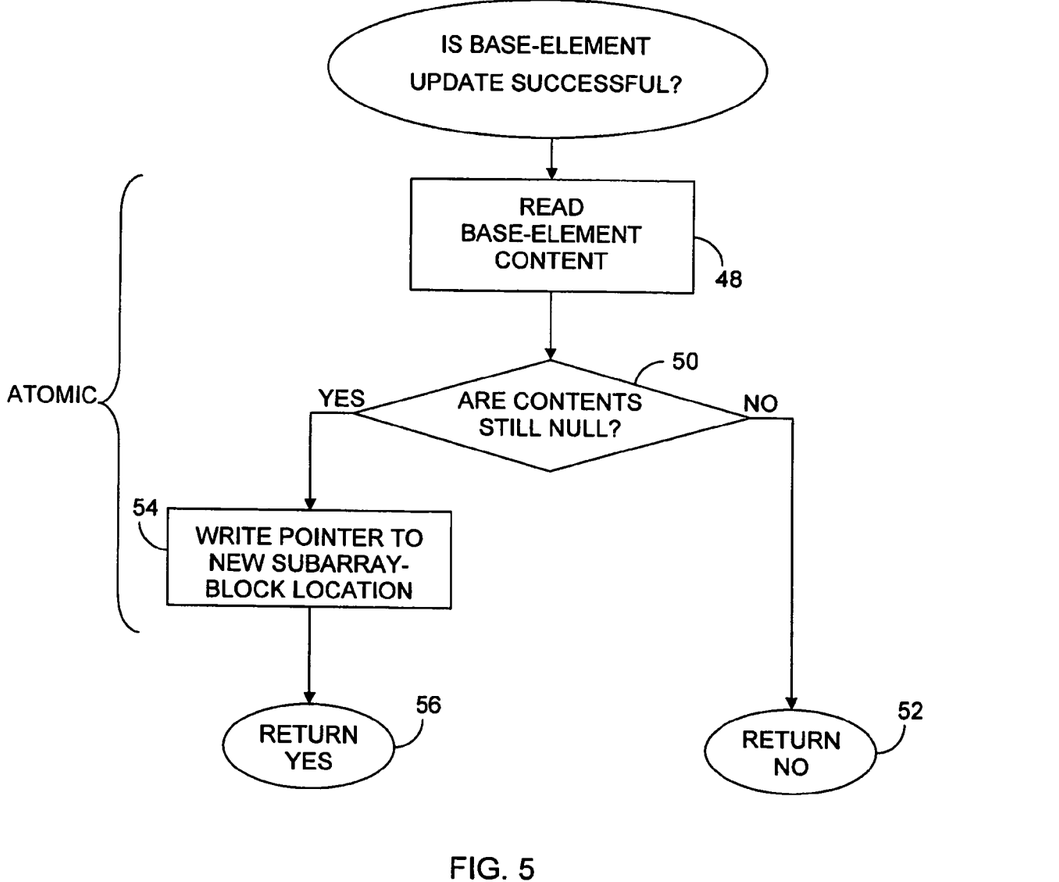
FIG. 5 is a flow chart that illustrates a portion of the FIG. 4 routine in more detail.

FIG. 5 depicts one way of implementing the operation represented by FIG. 4's block 46. Specifically, FIG. 5 represents doing so by employing an atomic compare-and-swap operation, which many processor architectures provide. Block 48 represents reading the base-array element's contents, and block 50 represents determining whether that element's contents are still NULL. If they are not, then another thread has allocated a subarray for that base-array element, and the intended update operation would overwrite that other thread's results. Since this could result in inconsistency, the array-access system refrains from writing the new contents into that base-array element, as FIG. 5's block 52 indicates, and the result of FIG. 4's block-46 step is that the base-element-update operation was not successful.

More typically, though, the base-array element's contents are still NULL. As blocks 54 and 56 indicate, FIG. 4's block-46 operation in that case writes into that base element a reference to the new subarray and returns an affirmative result. The reference will in most embodiments take the form of a pointer to that subarray. As FIG. 5 indicates, the processor performs the operations of blocks 48, 50, and 54 atomically: it does not perform other threads' operations between them. Those skilled in the art will recognize that there are ways of achieving the same effect in a multiprocessor system; even though a multiprocessor system's several processors can operate simultaneously, some multiprocessor systems do so coordinate their performance as to provide compare-and-swap and similar atomic operations.

Those skilled in the art will also recognize that some architectures lend themselves better to providing the atomic-operation effect in other ways. A common approach is to use the combination of instructions often referred to as "load linked" ("LL") and "store conditional" ("SC"). The thread uses LL to read the base-array location. If the location is thereby determined to contain NULL, the thread employs the SC operation to attempt to store the reference into the array. The semantics of LL and SC guarantee that this store will succeed only if the location has not been modified between the LL and SC operations. This approach thereby guarantees that the location is atomically changed from NULL to the new reference. Since in most architectures the SC can in certain circumstances fail even if the location has not changed since the LL, the thread should repeat the installation attempt if the store fails.

Another approach is to employ so-called transactional memory. In proposed transactional-memory architectures, a thread can execute a begin-transaction instruction, which causes the processor to monitor the operations that performed by that thread from then until the same thread executes a commit instruction. In response to the commit instruction, the processor determines whether its memory state is, or can be made to be, the same as though all of the monitored operations had been performed in a single atomic operation. If so, the commit operation succeeds. If not, the commit operation fails, and the processor rolls back the monitored operations. So a thread could define the accesses to the base-array slot as a transaction that it repeats if the commit operation fails.

If FIG. 4's update operation 46 is unsuccessful, the array-access system typically frees the subarray space, as block 58 indicates. In a typical compare-and-swap-instruction implementation, the operation returns what the target location contained at the beginning of the instruction. So, if the instruction succeeded, it returns the expected, NULL value, and it otherwise returns a pointer to the subarray newly allocated by another thread.

In any event, the array-access routine will at this point have a reference to a subarray for which space has been allocated. This is true independently of whether the base-element's contents had originally been found to be NULL in the block-42 operation and independently of whether, if they were NULL, the thread was successful in allocating space to the subarray on its own. The routine is therefore ready at this point to access the element that the offset value identifies.

In the illustrative embodiment, though, there may be some indirection in the manner employed to make that access. To understand this, first recall that the sizes associated with the various subarray elements in the illustrative embodiment increase exponentially with the subarray index. Since in the illustrative embodiment there are thirty-two base-array elements, the subarray size associated with some of the base-array's higher-index elements can be very large indeed. If the growable array reaches a size that requires subarrays whose locations those elements identify, finding a memory block large enough to hold the entire subarray may prove difficult. For this reason, the illustrative embodiment employs the composite-array technique recursively: the contents of one or more of base-array 30's elements may refer to an array that is composite in the same sense. That is, it may refer to another base array of references to subarrays of sizes implied by that other base array's component indexes. So FIG. 4 includes a block 60 that represents determining whether the referred-to subarray is itself composite.

There are a number of ways to make this determination. For example, the base-array reference may point to metadata for the subarray, and among the metadata may be an indication of whether the array is composite. Another approach is to include such an indication in the base-array element contents themselves.

A typical way of implementing the latter approach takes advantage of the fact that array locations in most systems will be at least word aligned. In the case of a system that employs eight-byte words, for example, the last three ($2^3=8$) bits of a valid array address will always be zero. So the array-access system can use those bits to indicate whether the base-array-element contents point to a composite array. If the pointed-to array is composite, the system can indicate that by, for instance, replacing the address's (zero-containing) least-significant bits with $1_2$ or some other non-zero value. So the system can determine whether the subarray is composite by testing one or more of the least-significant bits.

If the subarray is composite, then the offset value determined in the block-40 operation is used as the index into the (composite) subarray, as block 62 indicates, and the operation described above is repeated. If the subarray is not composite, the system performs the access to the subarray element that the offset value designates. Block 64 represents this operation.

Of course, the relationship between index value and subarray size does not have to be either of those described above. In particular, the sizes associated with the lowest base-array indexes are particularly small in the illustrated embodiment, and many implementations may instead employ larger values for the minimum subarray sizes. Also, the subarray sizes associated with the indexes in some embodiments could grow more rapidly; each subarray size could, for example, be four times the subarray size associated with the next-lower base-array index. Ultimately, though, the system as described so far imposes a limit on the size to which the overall composite array can grow, because it uses a fixed-size base array.

Now, the base-array size does not have to be very large for this limitation to be no limit at all as a practical matter; a composite array whose base array has sixty-four entries, for example, could grow to many quintillions of elements. Still, there may be applications that allocate a large number of arrays but actually populate only a very few. For such applications, it may be preferable to keep base-array sizes small enough that this limitation has a practical effect. So some implementations may eliminate this limitation by simply copying the base array's contents into a larger-sized array. It turns out that there are approaches to doing so whose synchronization and memory cost are modest, and we will consider two examples.

The first example approach is limited to the typical application, in which each newly added element is associated with the next available index value: no given-index element is added before any previous-index one is. In one implementation of this approach, the base array is provided with metadata that represent its size. The base array's metadata can be stored in locations contiguous to its elements' locations, but FIG. 2 depicts the metadata 68 as occupying locations non-contiguous to the base array 30. In one possible implementation, for example, the composite array could be identified by a "handle," which contains a pointer to the metadata 68, and the metadata would include a pointer 70 to the base array 30. In that way, if the base array needs to be moved, only the pointer to it in the metadata structure 68 needs to be updated, not every handle that serves to identify it. The metadata structure 68 may include, for example, a field 72 whose contents represent the array's size, and, when the array needs to grow to a size exceeding the one that field 72's contents indicate, a thread allocates space for a new, bigger base array 74, as FIG. 6 shows.

Figure 6:
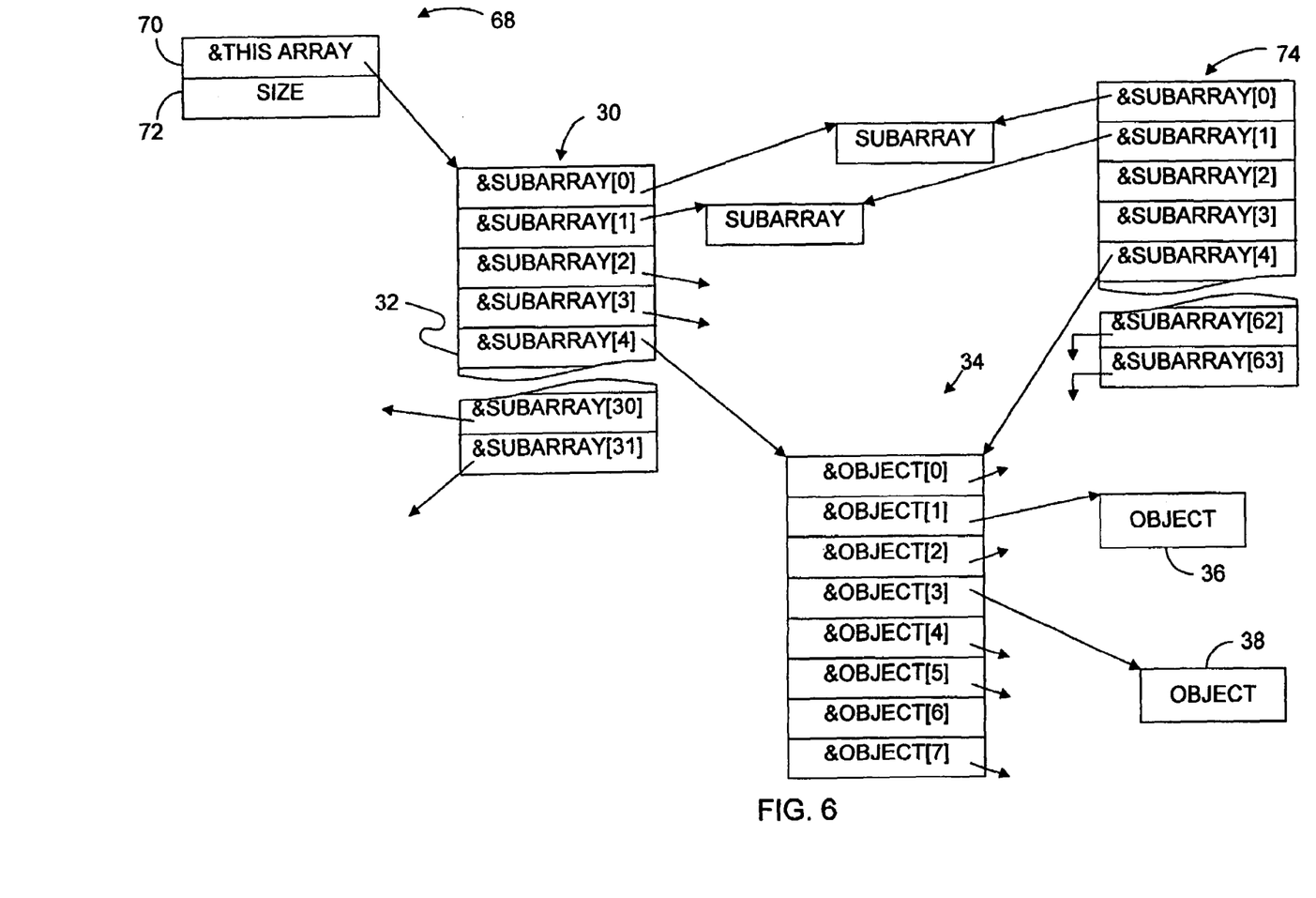
FIG. 6 is a data-structure diagram similar to FIG. 2 but showing one stage in the enlargement of a composite array's base array.
Figure 7:
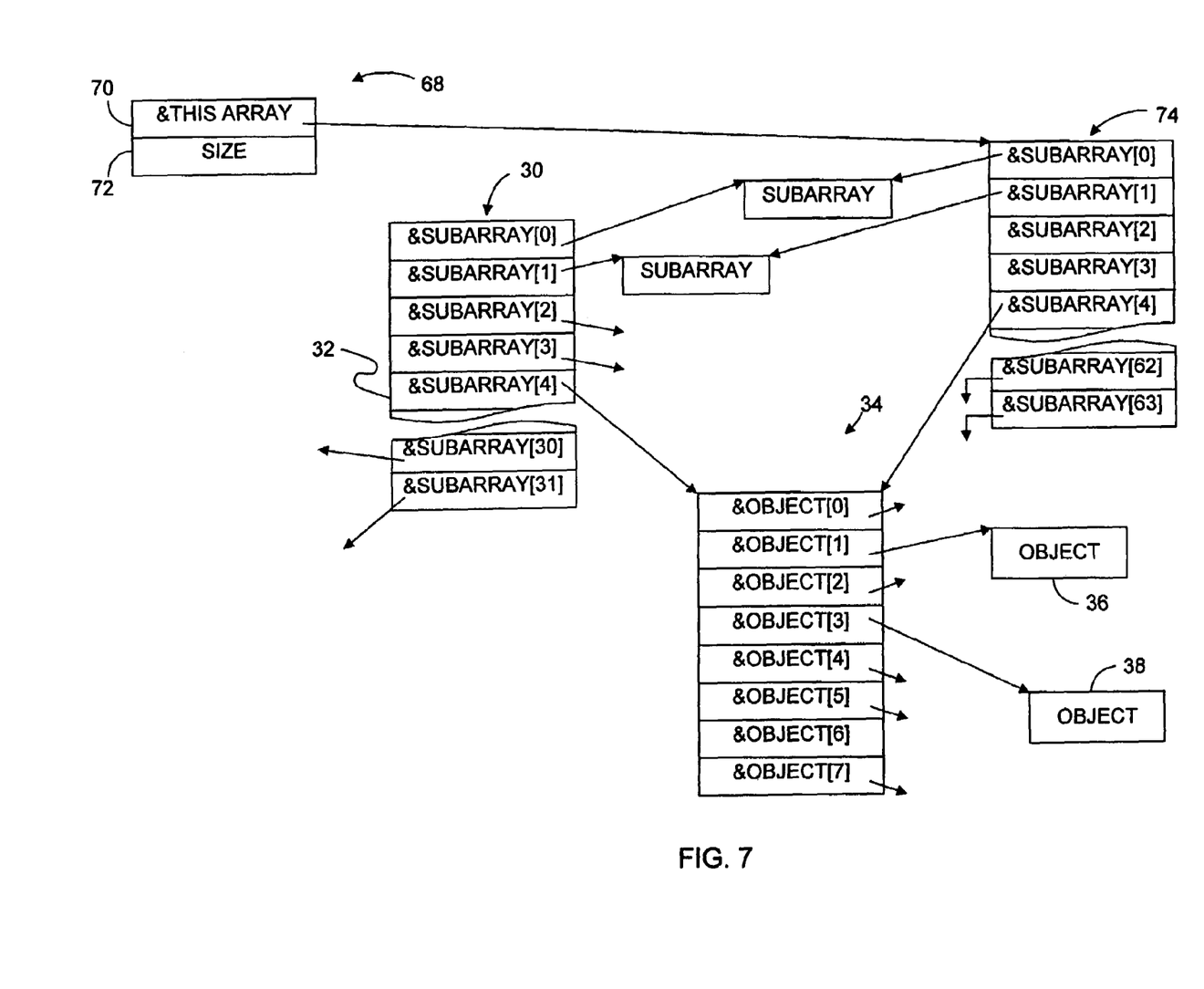
FIG. 7 is a similar data-structure diagram depicting a subsequent stage in that enlargement.

As FIG. 6 also shows, it would copy the old base array 30's contents into the new base array 74. During this allocation and copying, all other threads could still make their accesses by employing the previous base array 30, since its contents remain correct. Only after all of the contents had been copied into the new base array 74 would the base-array-copying thread update the metadata 68's pointer 70, as FIG. 7 illustrates, to refer to the new base array 74. It would perform this operation atomically with verification that pointer 70's contents had not been changed in the interim, i.e., with verification that some other thread had not itself enlarged the base array. In the illustrated organization, some synchronization of the size field's updating with the pointer to the base array, possibly by use of atomic operations, would be necessary. An alternative would be to place the size field at the beginning of the base array and thereby avoid an additional use of atomic operations for synchronization.

Of course, base-array copying does not require the "handle" approach just described; for example, all references to the composite array could be implemented simply as pointers to the base array, and all of those pointers could be updated when the copying has been completed.

Before considering the second example of limitlessly growable array, note why the first example can be used only when for applications that add elements in order. If that example is used in an application that adds elements out of order, a first thread could be required to expand the base array while one or more base-array elements have NULL contents. Before the first thread finishes but after it has copied a given element's NULL contents from the old base array to the new one, another thread could allocate a constituent array and place a pointer to it into that already-copied old-base-array element. If so, that constituent array would be lost when the first thread thereafter updates the handle to redirect threads to the new base array rather than the old one.

This problem can readily be eliminated by requiring the copying thread to allocate and install constituent arrays for all the NULL base-array entries before doing the copying. In the constituent-array-size scheme described above, though, that could impose as much as 50% overhead, so some embodiments may use a different approach. When the copying thread encounters a NULL entry in the old base array, for example, it could atomically replace the NULL entry with a distinguished value that a constituent-array-allocating thread will interpret as indicating that it is prohibited from adding the constituent array until the base array is replaced. If that atomic replacement fails—i.e., if the entry is no longer NULL when the copying thread attempts the replacement, then the entry is a newly installed constituent-array identifier or the distinguished value newly entered by another thread. If it is a constituent-array identifier, and the copying thread copies it into the new base array. If it is the distinguished value, the copying thread simply places (or leaves) a NULL entry in the new base array's corresponding slot.

The second example employs the latter technique, but it additionally addresses a further problem that would result if no further provisions were made. Without further provisions, the copying thread that enters such a distinguished value to prevent constituent-array installation is, as far as the thread needing to install a constituent array is concerned, essentially locking the array until the copying thread has finished its copying operation. This would detract significantly from performance if the copying thread is, say, preempted or otherwise delayed. As will be seen, the second example approach eliminates this problem by enlisting all accessing threads to participate in the copying and thereby prevent any single thread from effectively locking it.

In the second example, an uninitialized array is represented by a two-pointer variable BasePointer, which includes two pointer fields, BasePointer.old and Base-Pointer.new, both of which are NULL initially. If a first thread attempting to access the array finds that BasePointer.old is still NULL, it allocates a base array of some size (which is typically small, e.g., four entries), initializes the array to contain all NULL pointers, and uses a synchronization primitive such as an atomic compare-and-swap operation to give BasePointer.old a pointer to the new base array if no other thread has placed a pointer there in the interim. If the compare-and-swap operation fails, then another thread has already installed a base array, so the first thread frees the base array that it allocated, and it proceeds with the access.

To perform an access, the accessing thread initially verifies that, as will ordinarily be the case, BasePointer.new's contents are NULL, and it uses BasePointer.old to identify the current base array. If the thread needs to increase the composite array's size beyond the current base array's capacity, it allocates a new base array of, say, twice the current base array's size, installs a pointer to it in BasePointer.new, and copies values from the current base array's slots into the corresponding new-base-array slots. If some other thread attempts an access during the process, it observes the non-NULL value in Base-Pointer.new, concludes that an expansion is underway, and delays its access.

Instead of just waiting for the copying to be completed, though, it does copying of its own. Specifically, it proceeds through the current base array's entries, as the other copying thread does, copying each valid pointer entry that it thereby encounters into the corresponding new-base-array entry. If it encounters a NULL entry in the old base array, it changes that entry's contents to the distinguished value to indicate that the entry should not be changed. It does so in the manner described above, i.e., by atomically verifying that the value being replaced is still NULL and responding as described above if it is not. It then continues on, skipping any other entry that contains that distinguished value.

Any copying thread that completes the copying can then adopt the new base array as the current one. To do so, it atomically sets BasePointer.old to BasePointer.new and sets BasePointer.new to NULL. As a copying thread that has not reached completion advances through the current array, it may check BasePointer.new from time to time to determine whether some other thread has finished the copying process and has so indicated by setting that field to NULL. Such a check is not necessary, but performing it can sometimes enable a thread to resume its access operation without copying all entries.

Figure 8:
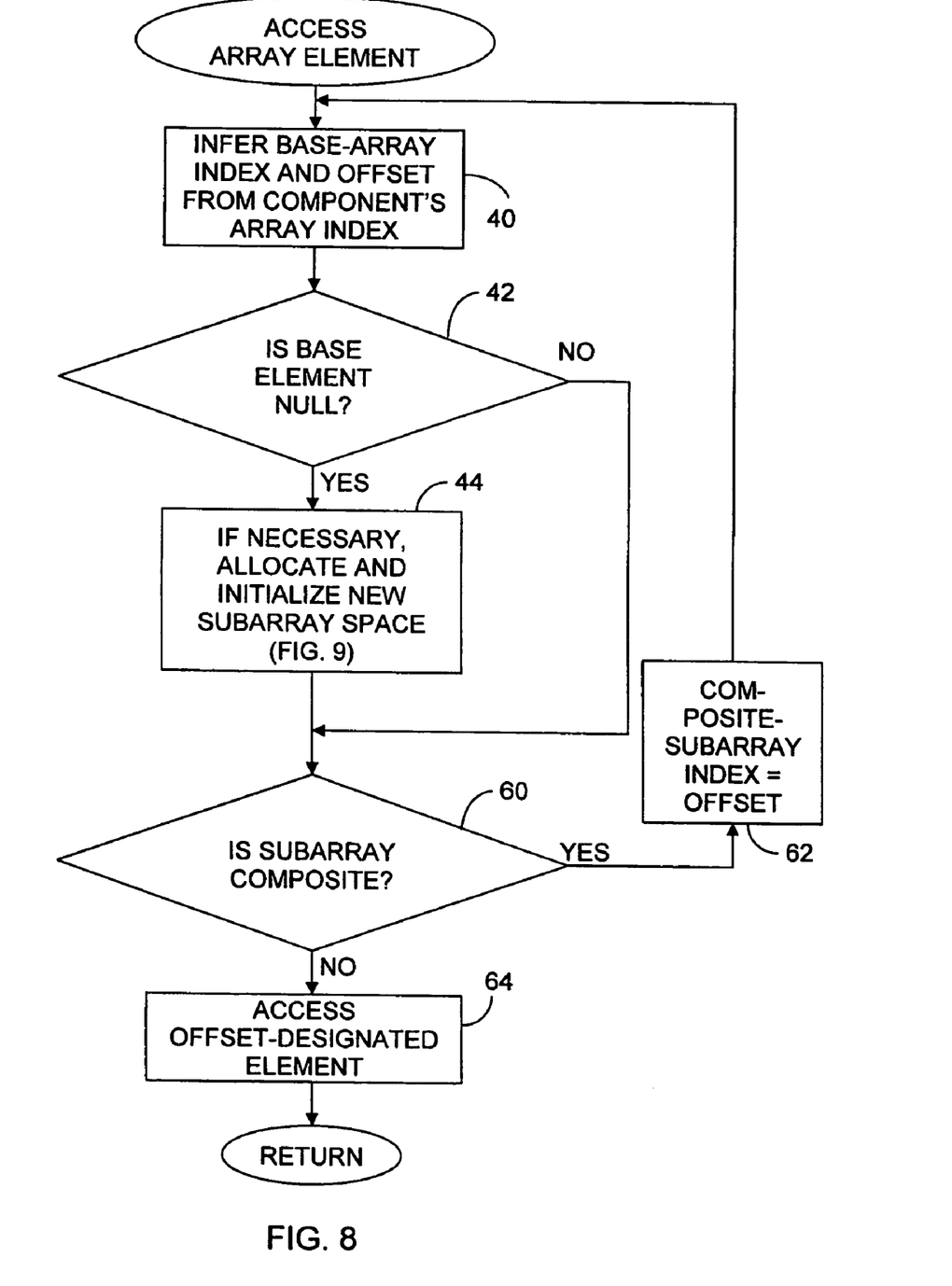
FIG. 8 is a flow chart of an alternative access routine.

Although there are advantages to implementing the invention, as FIG. 4 does, in a non-blocking manner, it may in some circumstances be considered preferable to avoid the unnecessary allocations in which the operation represented by FIG. 4's block 44 can occasionally result. FIG. 8 represents one way of avoiding unnecessary allocations. Most of its blocks represent operations essentially the same as those that similarly numbered blocks in FIG. 4 do. But, whereas FIG. 4's block 44 represents allocating and initializing a new subarray whenever the thread finds null contents in the base-array element, FIG. 8's block 80 represents performing such allocating and initializing only if the thread can acquire a lock, as will now be explained.

Figure 9:
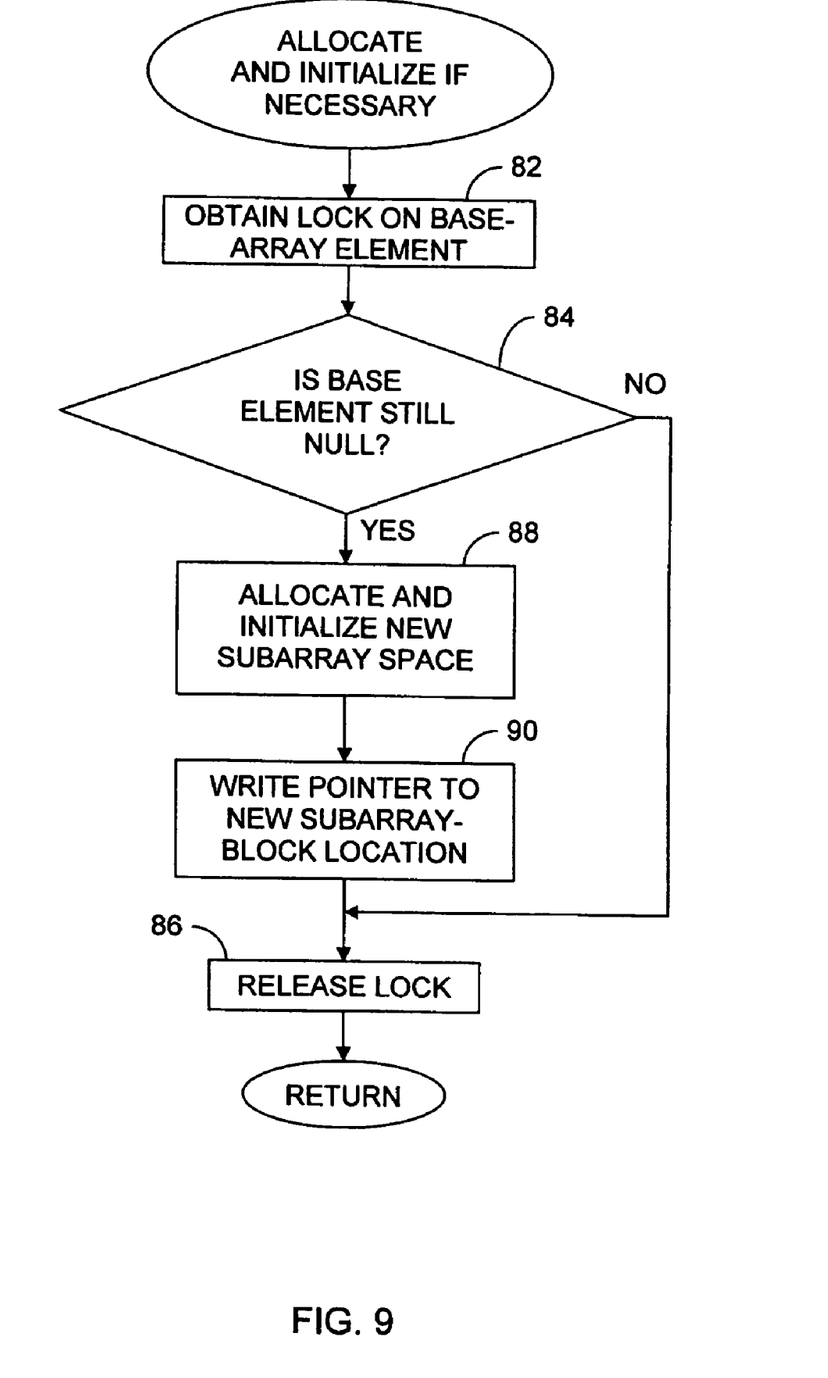
FIG. 9 is a flow chart that illustrates a portion of the FIG. 8 routine in more detail.

FIG. 9 illustrates the block-80 operation in more detail. That drawing's block 82 represents acquiring a lock on an appropriate resource, such as the base array or (as FIG. 8 indicates) only the base-array element of interest. When a given block reaches the block-82 operation, it will be blocked if another thread is in the process of allocating a subarray corresponding to the same element, and it will stay blocked until that other thread has installed a pointer in that element and released the lock. So, when the given thread has acquired the lock, it determines whether another thread has performed such an installation in the interim: it performs the block-84 step of again determining whether the base-array element's contents are null. If they are not, then it simply releases the lock, as block 86 indicates, and returns to the FIG. 8's block-60 operation. Otherwise, the thread proceeds, as block 88 indicates, to allocate the new subarray and initialize it. Moreover, since the given thread has the lock, it can install a pointer to that subarray, as block 90, indicates, without the risk that it will thereby overwrite a previously installed subarray pointer.

As block 90 indicates, the thread then releases the lock, and it returns to FIG. 8's operations and thereby accesses the target composite-array element. And it does so without ever having to release the subarray memory that it has just allocated, i.e., without having to perform an operation corresponding to that of FIG. 4's block 58.

Although the invention has been described above by reference to illustrative embodiments, its teachings are not limited to those embodiments' features. For example, although all base-array elements in the illustrated embodiment are references to subarrays, some implementations may store composite-array elements themselves in certain of the base-array locations. Also, although the illustrated embodiment associates larger subarray sizes with the higher indexes, some implementations may employ the opposite approach: as the composite array grows, the size of the next added subarray may decrease. Indeed, there is no reason in principle why the relationship between subarray size and base-array index needs to be monotonic.

In short, the present invention can be implemented in a wide variety of embodiments. It therefore it constitutes a significant advance in the art.

What is claimed is:

1. A computer system including memory and configured to operate as an array-access system that:
    A) so associates with each base-array index in a sequence of a plurality thereof a respective subarray size such that not all such subarray sizes are equal and thereby associates with each base-array index a cumulative base value equal to the sum of the subarray sizes associated with all preceding base-array indexes; and
    B) responds to an array-access request, which specifies an array index selected from a sequence of composite-index values and includes an array identifier that identifies an array located in the memory, by:
        i) treating the array thereby identified as a composite array that includes a base array;
        ii) inferring the included base array's location from the array-access request;
        iii) treating the array index thereby specified as a composite-array index;
        iv) identifying within the sequence of base-array indexes the last base-array index thereof whose cumulative base value is less than or equal to the number of composite-index values that precede the specified composite-array index in the sequence thereof; and
        v) in the case of at least some array-access requests, accessing a constituent array located in the memory and identified by the contents of the included base array's base-array element associated with that base-array index.

2. A computer system as defined in claim 1 wherein the operation of accessing the constituent array comprises accessing within the constituent array a constituent-array element identified by the difference between the specified composite-array index and the identified base-array element's cumulative base value.

3. A computer system as defined in claim 2 wherein the array-access system so allocates space for each constituent array that in at least some circumstances not all of the memory occupied by the constituent arrays identified by the base-array elements is contiguous.

4. A computer system as defined in claim 3 wherein the array-access system so writes the array-element values that no element's virtual address changes.

5. A computer system as defined in claim 2 wherein:
    A) in at least some cases the array-access request is a write request that additionally includes an array-element value to be written; and
    B) the array-access system:
        i) makes a determination of whether the contents of the base array's base-array element associated with the identified base-array index identify a constituent array located in the memory; and
        ii) if the array-access request is a write request,
            a) writes into the constituent array thereby identified if that determination is affirmative; and
            b) otherwise:
                (1) allocates in the memory a constituent array whose size is the subarray size associated with the identified base-array index; and
                (2) in at least some cases, performs a constituent-array-identifier-insertion operation, in which it places an identifier of that constituent array into the base array's base-array element associated with the identified base-array index.

6. A computer system as defined in claim 1 wherein:
    A) in at least some cases the array-access request is a write request that additionally includes an array-element value to be written; and
    B) the array-access system:
        i) makes a determination of whether the contents of the base array's base-array element associated with the identified base-array index identify a constituent array located in the memory; and
        ii) if the array-access request is a write request,
            a) writes into the constituent array thereby identified if that determination is affirmative; and
            b) otherwise:
                (1) allocates in the memory a constituent array whose size is the subarray size associated with the identified base-array index; and
                (2) in at least some cases, performs a constituent-array-identifier-insertion operation, in which it places an identifier of that constituent array into the base array's base-array element associated with the identified base-array index.

7. A computer system as defined in claim 6 wherein the array-access system so allocates space for each constituent array that in at least some circumstances not all of the memory occupied by the constituent arrays that the base-array elements identify is contiguous.

8. A computer system as defined in claim 6 wherein the array-allocation system makes the determination of whether the contents of the included base array's base-array element associated with the identified base-array index identify a constituent array located in the memory by determining whether that base-array element contains a predetermined no-constituent-array value.

9. A computer system as defined in claim 8 wherein:
    A) the array-access system executes in a plurality of access-system threads; and B) when any of the access-system threads performs a constituent-array-identifier-insertion operation, it does so by successfully executing an atomic write operation that atomically:
  i) attempts to verify that the base-array element into which the constituent-array identifier is to be inserted contains the no-constituent-array value;
  ii) writes the constituent-array identifier into that base-array element, and is thereby successful, if it thereby verifies that that base-array element contains the no-constituent-array value; and
  iii) otherwise refrains from writing the replacement value into the target location, and is thereby unsuccessful.

10. A computer system as defined in claim 9 wherein the atomic write operation is a compare-and-swap operation.

11. A computer system as defined in claim 9 wherein the atomic write operation is a store-conditional operation.

12. A computer system as defined in claim 9 wherein the computer system provides transactional memory and the atomic write operation is implemented as a transactional-memory transaction.

13. A computer system as defined in claim 9 wherein the operation of accessing the constituent array comprises accessing within the constituent array a constituent-array element identified by the difference between the specified composite-array index and the identified base-array element's cumulative base value.

14. A computer system as defined in claim 13 wherein the array-access system so writes the array-element values that no element's virtual address changes.

15. A computer system as defined in claim 13 wherein the array-access system so allocates space for each constituent array that in at least some circumstances not all of the memory occupied by the constituent arrays that the base-array elements identify is contiguous.

16. A computer system as defined in claim 13 wherein, in some circumstances, the array-access system places into the space allocated to the constituent array a further base array, whose elements identify further constituent arrays.

17. A computer system as defined in claim 9 wherein the array-access system so writes the array-element values that no element's virtual address changes.

18. A computer system as defined in claim 9 wherein the array-access system so allocates space for each constituent array that in at least some circumstances not all of the memory occupied by the constituent arrays that the base-array elements identify is contiguous.

19. A computer system as defined in claim 9 wherein, in some circumstances, the array-access system places into the space allocated to the constituent array a further base array, whose elements identify further constituent arrays.

20. A computer system as defined in claim 9 wherein the subarray size associated with each base-array index equals or exceeds the subarray size associated with any preceding base-array index.

21. A computer system as defined in claim 1 wherein the array-access system so writes the array-element values that no element's virtual address changes.

22. A computer system as defined in claim 1 wherein the array-access system so allocates space for each constituent array that in at least some circumstances not all of the memory occupied by the constituent arrays that the base-array elements identify is contiguous.

23. A computer system as defined in claim 22 wherein the array-access system so writes the array-element values that no element's virtual address changes.

24. A computer system as defined in claim 1 wherein, in some circumstances, the array-access system places into the space allocated to the constituent array a further base array, whose elements identify further constituent arrays.

25. A computer system as defined in claim 1 wherein the subarray size associated with each base-array index equals or exceeds the subarray size associated with any preceding base-array index.

26. A computer system as defined in claim 25 wherein the ratio that the subarray size associated with at least one base-array index bears to the subarray size associated with the base-array index that immediately precedes that at least one base-array index is the reciprocal of the ratio that it bears to the subarray size associated with the base-array index immediately preceded by that at least one base-array index.

27. A computer system as defined in claim 26 wherein the subarray sizes associated with most of the base-array indexes are twice the subarray sizes associated with the immediately preceding base-array indexes.

28. A storage medium containing instructions readable by a computer system including memory to configure the computer system to operate as an array-access system that:
  A) so associates with each base-array index in a sequence of a plurality thereof a respective subarray size such that not all such subarray sizes are equal and thereby associates with each base-array index a cumulative base value equal to the sum of the subarray sizes associated with all preceding base-array indexes; and
  B) responds to an array-access request, which specifies an array index selected from a sequence of composite-index values and includes an array identifier that identifies an array located in the memory, by:
    i) treating the array thereby identified as a composite array that includes a base array;
    ii) inferring the included base array's location from the array-access request;
    iii) treating the array index thereby specified as a composite-array index;
    iv) identifying within the sequence of base-array indexes the last base-array index thereof whose cumulative base value is less than or equal to the number of composite-index values that precede the specified composite-array index in the sequence thereof; and
    v) in the case of at least some array-access requests, accessing a constituent array located in the memory and identified by the contents of the included base array's base-array element associated with that base-array index.

29. A storage medium as defined in claim 28 wherein the operation of accessing the constituent array comprises accessing within the constituent array a constituent-array element identified by the difference between the specified composite-array index and the identified base-array element's cumulative base value.

30. A storage medium as defined in claim 28 wherein:
  A) in at least some cases the array-access request is a write request that additionally includes an array-element value to be written; and
  B) the array-access system:
    i) makes a determination of whether the contents of the base array's base-array element associated with the identified base-array index identify a constituent array located in the memory; and
    ii) if the array-access request is a write request,
      a) writes into the constituent array thereby identified if that determination is affirmative; and b) otherwise:
(1) allocates in the memory a constituent array whose size is the subarray size associated with the identified base-array index; and
(2) in at least some cases, performs a constituent-array-identifier-insertion operation, in which it places an identifier of that constituent array into the base array's base-array element associated with the identified base-array index.

31. A storage medium as defined in claim 30 wherein the array-allocation system makes the determination of whether the contents of the included base array's base-array element associated with the identified base-array index identify a constituent array located in the memory by determining whether that base-array element contains a predetermined no-constituent-array value.

32. A storage medium as defined in claim 31 wherein:
A) the array-access system executes in a plurality of access-system threads; and
B) when any of the access-system threads performs a constituent-array-identifier-insertion operation, it does so by successfully executing an atomic write operation that atomically:
   i) attempts to verify that the base-array element into which the constituent-array identifier is to be inserted contains the no-constituent-array value;
   ii) writes the constituent-array identifier into that base-array element, and is thereby successful, if it thereby verifies that that base-array element contains the no-constituent-array value; and
   iii) otherwise refrains from writing the replacement value into the target location, and is thereby unsuccessful.

33. A storage medium as defined in claim 32 wherein the array-access system so writes the array-element values that no element's virtual address changes.

34. A storage medium as defined in claim 32 wherein the array-access system so allocates space for each constituent array that in at least some circumstances not all of the memory occupied by the constituent arrays that the base-array elements identify is contiguous.

35. A storage medium as defined in claim 32 wherein, in some circumstances, the array-access system places into the space allocated to the constituent array a further base array, whose elements identify further constituent arrays.

36. A storage medium as defined in claim 32 wherein the subarray size associated with each base-array index equals or exceeds the subarray size associated with any preceding base-array index.

37. A storage medium as defined in claim 28 wherein the array-access system so writes the array-element values that no element's virtual address changes.

38. A storage medium as defined in claim 28 wherein the array-access system so allocates space for each constituent array that in at least some circumstances not all of the memory occupied by the constituent arrays that the base-array elements identify is contiguous.

39. A storage medium as defined in claim 28 wherein, in some circumstances, the array-access system places into the space allocated to the constituent array a further base array, whose elements identify further constituent arrays.

40. A storage medium as defined in claim 28 wherein the subarray size associated with each base-array index equals or exceeds the subarray size associated with any preceding base-array index.

41. For providing array access in a computer system that includes memory, a method that comprises:

A) so associating with each base-array index in a sequence of a plurality thereof a respective subarray size such that not all such subarray sizes are equal and thereby associating with each base-array index a cumulative base value equal to the sum of the subarray sizes associated with all preceding base-array indexes; and
B) responding to an array-access request, which specifies an array index selected from a sequence of composite-index values and includes an array identifier that identifies an array located in the memory, by:
   i) treating the array thereby identified as a composite array that includes a base array;
   ii) inferring the included base array's location from the array-access request;
   iii) treating the array index thereby specified as a composite-array index;
   iv) identifying within the sequence of base-array indexes the last base-array index thereof whose cumulative base value is less than or equal to the number of composite-index values that precede the specified composite-array index in the sequence thereof; and
   v) in the case of at least some array-access requests, accessing a constituent array located in the memory and identified by the contents of the included base array's base-array element associated with that base-array index.

42. A method as defined in claim 41 wherein the operation of accessing the constituent array comprises accessing within the constituent array a constituent-array element identified by the difference between the specified composite-array index and the identified base-array element's cumulative base value.

43. A method as defined in claim 41 wherein:
A) in at least some cases the array-access request is a write request that additionally includes an array-element value to be written; and
B) the method further includes:
   i) making a determination of whether the contents of the base array's base-array element associated with the identified base-array index identify a constituent array located in the memory; and
   ii) if the array-access request is a write request,
      a) writing into the constituent array thereby identified if that determination is affirmative; and
      b) otherwise:
         (1) allocating in the memory a constituent array whose size is the subarray size associated with the identified base-array index; and
         (2) in at least some cases, performing a constituent-array-identifier-insertion operation, in which it places an identifier of that constituent array into the base array's base-array element associated with the identified base-array index.

44. A method as defined in claim 43 wherein the determination of whether the contents of the included base array's base-array element associated with the identified base-array index identify a constituent array located in the memory is made by determining whether that base-array element contains a predetermined no-constituent-array value.

45. A method as defined in claim 44 wherein:
A) the method is performed by executing a plurality of access-system threads; and B) when any of the access-system threads performs a constituent-array-identifier-insertion operation, it does so by successfully executing an atomic write operation that atomically:
  i) attempts to verify that the base-array element into which the constituent-array identifier is to be inserted contains the no-constituent-array value;
  ii) writes the constituent-array identifier into that base-array element, and is thereby successful, if it thereby verifies that that base-array element contains the no-constituent-array value; and
  iii) otherwise refrains from writing the replacement value into the target location, and is thereby unsuccessful.

46. A method as defined in claim 45 wherein the array-element values are so written that no element's virtual address changes.

47. A method as defined in claim 45 wherein space for each constituent array is so allocated that in at least some circumstances not all of the memory occupied by the constituent arrays that the base-array elements identify is contiguous.

48. A method as defined in claim 45 that, in some circumstances, places into the space allocated to the constituent array a further base array, whose elements identify further constituent arrays.

49. A method as defined in claim 45 wherein the subarray size associated with each base-array index equals or exceeds the subarray size associated with any preceding base-array index.

50. A method as defined in claim 41 wherein the array-element values are so written that no element's virtual address changes.

51. A method as defined in claim 41 wherein space for each constituent array is so allocated that in at least some circumstances not all of the memory occupied by the constituent arrays that the base-array elements identify is contiguous.

52. A method as defined in claim 41 that, in some circumstances, places into the space allocated to the constituent array a further base array, whose elements identify further constituent arrays.

53. A method as defined in claim 41 wherein the subarray size associated with each base-array index equals or exceeds the subarray size associated with any preceding base-array index.

54. An electromagnetic signal representing instructions maintained on a storage medium readable by a computer system including memory to configure the computer system to operate as an array-access system that:
  A) so associates with each base-array index in a sequence of a plurality thereof a respective subarray size such that not all such subarray sizes are equal and thereby associates with each base-array index a cumulative base value equal to the sum of the subarray sizes associated with all preceding base-array indexes; and
  B) responds to an array-access request, which specifies an array index selected from a sequence of composite-index values and includes an array identifier that identifies an array located in the memory, by:
    i) treating the array thereby identified as a composite array that includes a base array;
    ii) inferring the included base array's location from the array-access request;
    iii) treating the array index thereby specified as a composite-array index;
    iv) identifying within the sequence of base-array indexes the last base-array index thereof whose cumulative base value is less than or equal to the number of composite-index values that precede the specified composite-array index in the sequence thereof; and
    v) in the case of at least some array-access requests, accessing a constituent array located in the memory and identified by the contents of the included base array's base-array element associated with that base-array index.

55. An electromagnetic signal as defined in claim 54 wherein the operation of accessing the constituent array comprises accessing within the constituent array a constituent-array element identified by the difference between the specified composite-array index and the identified base-array element's cumulative base value.

56. An electromagnetic signal as defined in claim 54 wherein:
  A) in at least some cases the array-access request is a write request that additionally includes an array-element value to be written; and
  B) the array-access system:
    i) makes a determination of whether the contents of the base array's base-array element associated with the identified base-array index identify a constituent array located in the memory; and
    ii) if the array-access request is a write request,
      a) writes into the constituent array thereby identified if that determination is affirmative; and
      b) otherwise:
        (1) allocates in the memory a constituent array whose size is the subarray size associated with the identified base-array index; and
        (2) in at least some cases, performs a constituent-array-identifier-insertion operation, in which it places an identifier of that constituent array into the base array's base-array element associated with the identified base-array index.

57. An electromagnetic signal as defined in claim 56 wherein the array-allocation system makes the determination of whether the contents of the included base array's base-array element associated with the identified base-array index identify a constituent array located in the memory by determining whether that base-array element contains a predetermined no-constituent-array value.

58. An electromagnetic signal as defined in claim 57 wherein:
  A) the array-access system executes in a plurality of access-system threads; and
  B) when any of the access-system threads performs a constituent-array-identifier-insertion operation, it does so by successfully executing an atomic write operation that atomically:
    i) attempts to verify that the base-array element into which the constituent-array identifier is to be inserted contains the no-constituent-array value;
    ii) writes the constituent-array identifier into that base-array element, and is thereby successful, if it thereby verifies that that base-array element contains the no-constituent-array value; and
    iii) otherwise refrains from writing the replacement value into the target location, and is thereby unsuccessful.

59. An electromagnetic signal as defined in claim 54 wherein the array-access system so writes the array-element values that no element's virtual address changes.

60. An electromagnetic signal as defined in claim 54 wherein the array-access system so allocates space for each constituent array that in at least some circumstances not all of the memory occupied by the constituent arrays that the base-array elements identify is contiguous.

61. An electromagnetic signal as defined in claim 54 wherein, in some circumstances, the array-access system places into the space allocated to the constituent array a further base array, whose elements identify further constituent arrays.

62. An electromagnetic signal as defined in claim 54 wherein the subarray size associated with each base-array index equals or exceeds the subarray size associated with any preceding base-array index.

63. An array-access system comprising:
  A) means for so associating with each base-array index in a sequence of a plurality thereof a respective subarray size such that not all such subarray sizes are equal and thereby associating with each base-array index a cumulative base value equal to the sum of the subarray sizes associated with all preceding base-array indexes; and
  B) means for responding to an array-access request, which specifies an array index selected from a sequence of composite-index values and includes an array identifier that identifies an array located in the memory of a computer system, by:
  i) treating the array thereby identified as a composite array that includes a base array;
  ii) inferring the included base array's location from the array-access request;
  iii) treating the array index thereby specified as a composite-array index;
  iv) identifying within the sequence of base-array indexes the last base-array index thereof whose cumulative base value is less than or equal to the number of composite-index values that precede the specified composite-array index in the sequence thereof; and
  v) in the case of at least some array-access requests, accessing a constituent array located in the memory and identified by the contents of the included base array's base-array element associated with that base-array index.

* * * * *